United States Patent
Ducellier et al.

(10) Patent No.: US 6,600,849 B2
(45) Date of Patent: Jul. 29, 2003

(54) CONTROL SYSTEM FOR OPTICAL CROSS-CONNECT SWITCHES

(75) Inventors: Thomas Ducellier, Ottawa (CA); Claude Rolland, Nepean (CA); Richard Habel, Nepean (CA); Rajiv Iyer, Ottawa (CA); Barrie Keyworth, Stittsville (CA)

(73) Assignee: JDS Uniphase Inc., Ottawa (CA)

( * ) Notice: Subject to any disclaimer, the term of this patent is extended or adjusted under 35 U.S.C. 154(b) by 24 days.

(21) Appl. No.: 09/988,507

(22) Filed: Nov. 20, 2001

(65) Prior Publication Data
US 2002/0076136 A1 Jun. 20, 2002

(30) Foreign Application Priority Data

Nov. 20, 2000 (CA) ............................... 2326362
Dec. 6, 2000 (CA) ............................... 2327862
Dec. 19, 2000 (CA) ............................... 2328756

(51) Int. Cl.[7] .............................. G02B 6/26; G02B 6/42
(52) U.S. Cl. .............................. 385/17; 385/16; 385/18; 385/19; 385/24; 359/128
(58) Field of Search .............................. 385/16, 17, 18, 385/19, 20, 24; 359/128

(56) References Cited

U.S. PATENT DOCUMENTS

| 5,524,153 A | 6/1996 | Laor ............................... 385/16 |
| 5,914,801 A | 6/1999 | Dhuler et al. ............................... 359/230 |
| 6,002,818 A | 12/1999 | Fatehi et al. ............................... 385/17 |
| 6,005,993 A | 12/1999 | MacDonald ............................... 385/16 |
| 6,005,998 A | 12/1999 | Lee ............................... 385/33 |
| 6,087,747 A | 7/2000 | Dhuler et al. ............................... 310/90 |
| 6,097,858 A * | 8/2000 | Laor ............................... 385/16 |
| 6,097,859 A | 8/2000 | Solgaard et al. ............................... 385/17 |
| 6,097,860 A | 8/2000 | Laor ............................... 385/17 |
| 6,101,299 A | 8/2000 | Laor ............................... 385/16 |
| 6,134,042 A | 10/2000 | Dhuler et al. ............................... 359/224 |
| 6,253,001 B1 | 6/2001 | Hoen ............................... 385/17 |
| 6,289,145 B1 | 9/2001 | Solgaard et al. ............................... 385/17 |
| 6,424,757 B1 * | 7/2002 | Sparks et al. ............................... 385/16 |
| 2002/0181848 A1 * | 12/2002 | Lemoff ............................... 385/18 |
| 2002/0186918 A1 * | 12/2002 | Burroughs ............................... 385/18 |
| 2002/0191901 A1 * | 12/2002 | Jensen ............................... 385/24 |

FOREIGN PATENT DOCUMENTS

WO    WO 99/66354    12/1999

* cited by examiner

*Primary Examiner*—John Juba
*Assistant Examiner*—Leo Boutsikaris
(74) *Attorney, Agent, or Firm*—Neil Teitelbaum

(57) ABSTRACT

A control system is designed to control an optical cross-connect having a switch core defined by first and second independently movable beam deflectors capable of selectively defining an optical path between a pair of ports of the optical cross-connect. An optical element having optical power is arranged in a propagation path of light beams between the first and second beam deflectors. The control system includes a pilot light source, an optical sensor associated with each beam deflector, and a feedback path. The a pilot light source inserts a pilot light into the switch core colinearly with live traffic. The optical sensor detects a predetermined geometric property of the pilot light emerging from the switch core. This predetermined geometric property is unambiguously associated with an angular position of the associated beam deflector. The feedback path actively controls a position of the associated beam deflector based on the detected geometric property.

25 Claims, 6 Drawing Sheets

CONTROL SYSTEM FOR OPTICAL CROSS-CONNECT SWITCHES

CROSS-REFERENCE TO RELATED APPLICATIONS

This application is based on, and claims priority of, Canadian Patent Application No. 2,326,362, filed Nov. 20, 2000, Canadian Patent Application No. 2,327,862, filed Dec. 6, 2000, and Canadian Patent Application No. 2,328,756, filed Dec. 19, 2000.

MICROFICHE APPENDIX

Not Applicable.

TECHNICAL FIELD

The present invention relates to optical cross-connect switches, and in particular to a control system for an optical cross connect capable of detecting and correcting mirror positioning errors within the optical cross-connect.

BACKGROUND OF THE INVENTION

Optical matrix cross-connects (or switches) are commonly used in communications systems for transmitting voice, video and data signals. Generally, optical matrix cross-connects include multiple input and/or output ports and have the ability to connect, for purposes of signal transfer, any input port/output port combination, and preferably, for N×M switching applications, allow for multiple connections at one time. At each port, optical signals are transmitted and/or received via an end of an optical waveguide. The waveguide ends of the input and output ports are optically connected across a switch core. In this regard, for example, the input and output waveguide ends can be physically located on opposite sides of a switch core for direct or folded optical path communication therebetween, in side-by-side matrices on the same physical side of a switch core facing a mirror, or they may be interspersed in a single matrix arrangement facing a mirror.

Establishing a connection between an input port and a selected output port involves configuring an optical path across the switch core. One known way to configure the optical path involves the use of one or more movable mirrors interposed between the input and output ports. In this case, the waveguide ends remain stationary and the mirrors are used to deflect a light beam propagating through the switch core from the input port to effect the desired switching. Micro-electro-mechanical mirrors known in the art can allow for one- or two-dimensional targeting to optically connect any input port to any output port. For example, U.S. Pat. No. 5,914,801, entitled MICROELECTROMECHANICAL DEVICES INCLUDING ROTATING PLATES AND RELATED METHODS, which issued to Dhuler et al on Jun. 22, 1999; U.S. Pat. No. 6,087,747, entitled MICROELECTROMECHANICAL BEAM FOR ALLOWING A PLATE TO ROTATE IN RELATION TO A FRAME IN A MICRO-ELECTROMECHANICAL DEVICE, which issued to Dhuler et al on Jul. 11, 2000; and U.S. Pat. No. 6,134,042, entitled REFLECTIVE MEMS ACTUATOR WITH A LASER, which issued to Dhuler et al on Oct. 17, 2000, disclose micro-electro-mechanical mirrors that can be controllably moved in two dimensions to effect optical switching.

One of the major challenges of designing an optical cross-connect (OXC) switch using tiltable Micro-Electro-Mechanical Switch (MEMS) mirrors is the need to accurately control each of the mirrors so that low fiber-to-fiber losses can be maintained over the operation lifetime of the switch. The major obstacle to creating an optical switch is the necessary control for precisely addressing each of the mirrors to achieve accurate switching with low loss. Small errors in angle over the optical path length of the switch can easily result in large coupling errors.

U.S. Pat. No. 6,097,858, entitled SENSING CONFIGURATION FOR FIBER OPTIC SWITCH CONTROL SYSTEM, and U.S. Pat. No. 6,097,860, entitled COMPACT OPTICAL MATRIX SWITCH WITH FIXED LOCATION FIBERS, both of which issued to Laor on Aug. 1, 2000, disclose switch control systems for controlling the position of two-dimensionally movable mirrors in an optical switch. Laor discloses a complex control system for detecting angle deviation. Because the optical path includes first and second reflections (in a Z pattern) between launching a focused beam and coupling a switched beam to a selected output port, a cumulative error will be detected at the output. That is, the coupling error of the switched beam into the output port will be the aggregate of the angular positioning errors of both of the involved mirrors. Determination of the angle error of each mirror is complex and difficult.

Accordingly, a control system for an optical cross connect, in which angle position errors of each involved mirror is unambiguously detected and controlled, remains highly desirable.

SUMMARY OF THE INVENTION

Accordingly, an object of the present invention is to provide a control system for an optical cross connect, in which angle position errors of each involved mirror is unambiguously detected and controlled.

Thus an aspect of the present invention provides a control system for an optical cross-connect having a switch core defined by a pair of opposed MEMS mirror arrays designed to selectively define an optical path between a pair of waveguides of the optical cross-connect. The control mechanism includes an optical element having optical power disposed in the optical path between the MEMS arrays; a respective optical sensor associated with each MEMS mirror; and a feedback control between the optical sensor and its associated MEMS mirror.

Due to the location of the optical element having optical power, a light beam switched through the cross-connect encounters the optical element having optical power three times: a first encounter between the input waveguide and a first MEMS mirror; a second encounter between the first MEMS mirror and a second MEMS mirror in the opposite MEMS array; and a third encounter between the second MEMS mirror and the output waveguide. As a result, positioning errors of each involved mirror cause characteristic perturbations in geometric properties of the light beam arriving at the output waveguide, and these perturbations can be unambiguously related to the specific mirror in question. For example, a positioning error of the first mirror causes a lateral offset of the propagation path of the light beam arriving at the output waveguide, while a positioning error of the second mirror causes an angular offset of the propagation path of the light beam arriving at the output waveguide. It is therefore possible to unambiguously relate geometric properties (angle or lateral position) of the path of light beams arriving at the output waveguide to a specific mirror.

Thus each optical sensor is designed to detect a predetermined geometric property (i.e., either lateral or angular position) of a respective light beam arriving at an associated waveguide from a respective MEMs mirror. The feedback control can then actively control the respective mirror, based on the detected geometric property, to optimize coupling of the light beam into the waveguide.

Advantageously, one wavefront sensor and feedback control is provided for each mirror. Each mirror of each array can therefore be checked and corrected, simultaneously, in real time.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1A:
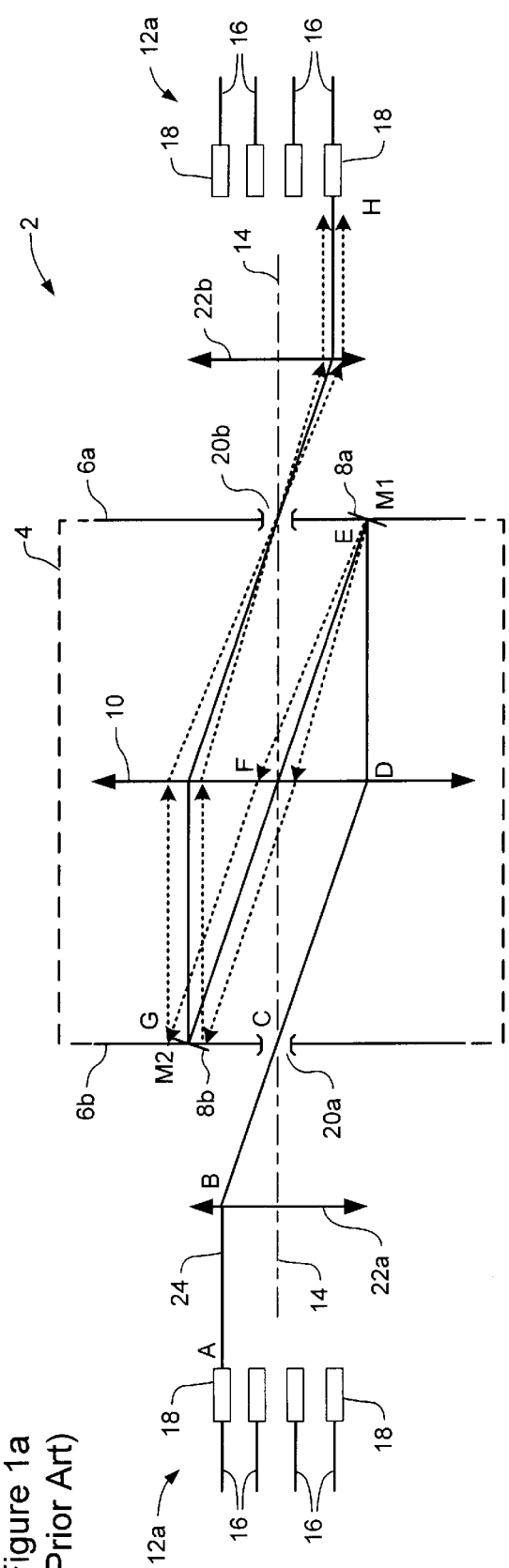
FIGS. 1a and 1b schematically illustrate an optical cross-connect in which the present invention may be deployed.

The present invention provides a control system for controlling the angular position of mirrors used to switch light beams between input and output waveguides of an optical cross-connect. FIG. 1 illustrates principle elements of an optical cross-connect in which the present invention may be deployed.

As shown in FIG. 1, an optical cross-connect 2 includes a switch core 4 defined by a pair of opposed arrays 6a–6b of Micro-Electro-Mechanical Switch (MEMS) mirrors 8 separated by an optical element having optical power 10. Each array 6 lies in a focal plane of the optical element 10, and may be provided as a 1-dimensional linear array or 2-dimensional matrix of as many as 4000 (or more) MEMS mirrors 8. Each MEMS mirror 8 is individually controlled to switch a received light beam to any desired location on the opposite array 6. In order to simplify illustration, only one MEMS mirror 8 is shown in each array 6.

The optical element having optical power 10 may be either a mirror or a lens. In the illustrated embodiments, the optical element 10 is shown as a lens for ease of illustration only. In embodiments in which the optical element 10 is a mirror, the optical paths illustrated in the appended figures are "folded" about the plane of the optical element 10, but are otherwise closely similar to those illustrated in the figures. The use of a mirror as the optical element 10 may have an advantage over a lens, in that a mirror enables folding of optical paths, and thereby permits a more compact design.

While not essential for the purposes of the present invention, the optical element 10 is preferably a true Angle-To-Offset (ATO) element whose focal length approximately corresponds to the near zone length (multi mode) or Rayleigh range (single mode) of light propagating through the cross-connect. The use of a true ATO element means that the size (i.e., the cross-sectional area) of a beam switched through the cross-connect 2 is substantially the same at both input and output waveguides. This feature is useful for optimizing coupling of the beam between the input and output waveguides. However, it is not strictly necessary for controlling mirror positions in accordance with the present invention. On the other hand, in all cases, the element 10 operates to convert between parallel and angular converging/diverging beams, which is also a characteristic of a true ATO element. Accordingly, for the purposes of the present invention, the term "ATO" will be used in describing the element 10, even though true ATO functionality is not strictly required.

A pair of fiber bundles 12 are arranged along a common optical axis 14 on opposite sides of the switch core 4. Each fiber bundle 12 includes an array of waveguides 16, each of which terminates in a collimator 18 that operates to guide a light beam into (and/or out of) the associated waveguide 16. The number and arrangement of waveguides 16 in each fiber bundle 12 will normally correspond with the number and arrangement of MEMS mirrors 8 within each array 6, so that there will be a one-to-one correspondence between each waveguide 16/collimator 18 and a MEMS mirror 8 on the opposite side of the switch core 4.

Each MEMS array 6 is provided with an optical bypass 20 (e.g., a hole or optically transparent region) through which light beams propagating to/from each waveguide 16 can enter/leave the switch core 4. The propagation paths of light beams emerging from each waveguide 16 are made to converge within the optical bypass 20. In the embodiment of FIG. 1, this is accomplished by means of a relay lens 22 positioned between each fiber bundle 12 and the nearest MEMS array 6, and separated from the MEMS array 6 by a distance that approximately corresponds with the focal length of the relay lens 22. This arrangement facilitates a compact switch core design while enabling a light beam to propagate between each waveguide 16 and its corresponding MEMS mirror 8 on the opposite side of the switch core 4.

An optimum propagation path 24 of a light beam through the cross-connect is illustrated by the solid line A-H in FIG. 1a. Thus, a light beam enters the optical cross-connect 2 through a respective input waveguide 16 (at A), is deflected by the relay lens 22 (at B), and enters the switch core 4 through optical bypass 20a (at C). As the input light beam propagates through the switch core 4, it is deflected by the lens 10 (at D), and made incident upon a first MEMS mirror 8a (M1, at E) of optical array 6a. Mirror M1 8a has a fixed association with the input waveguide, but is independently movable to enable the light beam to be deflected to any MEMS mirror 8 within the opposite MEMS array 6b. Thus, in the illustrated example, mirror M1 8a is positioned to switch the light beam through the lens 10 (at F), to a second MEMS mirror 8b (M2, at G) of the opposite optical array 6b. Mirror M2 has a fixed association with an output waveguide 16 (at H), and is positioned to switch the light beam to that output waveguide 16, via the lens 10, second optical bypass 20b and output relay lens 22b.

Figure 1B:
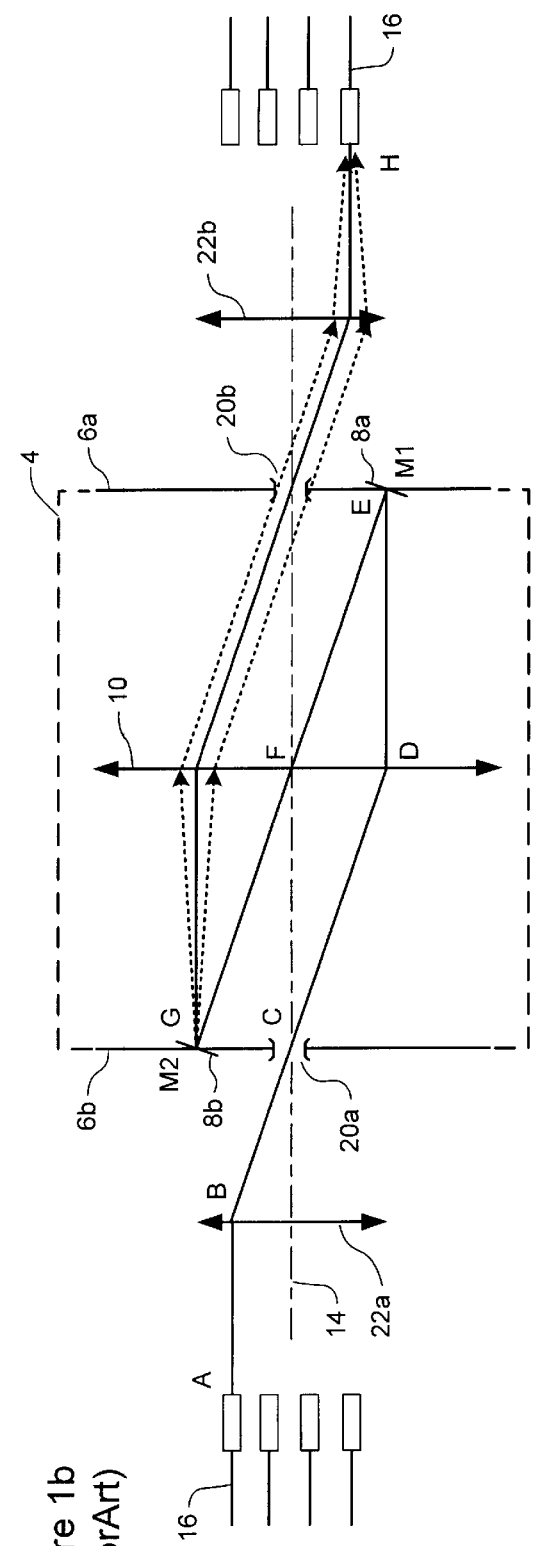

As shown in FIG. 1, the ideal propagation path 24 of the light beam (i.e., yielding optimum coupling of light between the input and output waveguides) follows the solid line between points A and H. As will be appreciated, obtaining this ideal path is entirely dependent on the accuracy with which the involved mirrors M1 8a and M2 8b are controlled. The effect of a positioning error of mirror M1 8a is illustrated by dashed lines in FIG. 1a, while the effect of a positioning error of mirror M2 8b is illustrated in by dashed lines in FIG. 1b.

As shown in FIG. 1a, an error in the angular position of mirror M1 8a causes a lateral offset of the light beam arriving at mirror M2 8b. Provided that this offset beam still falls on mirror M2 8b, the lateral offset will be translated (by the lens 10 and relay lens 22b) into a corresponding lateral offset of the light beam arriving at the output collimator 18b (at H). As shown in FIG. 1b, an error in the angular position of mirror M2 causes a corresponding angular offset of the light beam arriving at the output collimator 18b (at H), via the lens 10 and relay lens 22b. Clearly, angular errors in both mirrors M1 and M2 will be compounded, so that the light beam arriving at the output collimator 18b (at H) would exhibit both lateral and angular offsets.

The present invention provides a control system for actively controlling the angular position of the mirrors within the switch core 4. The system of the invention is based on recognition that the angular and lateral offsets of a light beam arriving at a collimator 18 can be unambiguously related to one of the involved mirrors. These geometric properties are caused by the transformation of the light on the optical path through the lens 10, one pass causing a Fourier transformation of the signal resulting in an angular offset, while two passes does not transform the signal, but results in a lateral offset. Principle components and operations of the present invention are described below with reference to a first preferred embodiment illustrated in FIGS. 2–4. Principle components and operations of second and third preferred embodiments are then described with reference to FIGS. 5 and 6, respectively.

In general, the control system of the present invention includes at least one light source for directing a pilot light through the switch core; a respective optical sensor array arranged to detect a geometric property of a pilot light arriving at each collimator 18 of a respective fiber bundle 12; and a feedback path which operates to control the angular position of each MEMS mirror, based on the detected geometric feature.

In principle, the system of the invention can utilize "live" (i.e., traffic-carrying) light beams as the pilot light for detection and control of mirror position. However, out-of-band pilot light is preferable, as this enables dynamic control of the mirrors, in real-time, with minimum interference with live traffic within the cross-connect. As will be appreciated, the detected geometric property can be either the angle or the lateral position of the pilot light. The feedback path operates by comparing the detected geometric property to a reference to determine an offset (or error) from the ideal path, and then controls the associated mirror to minimize this offset.

Figure 2:
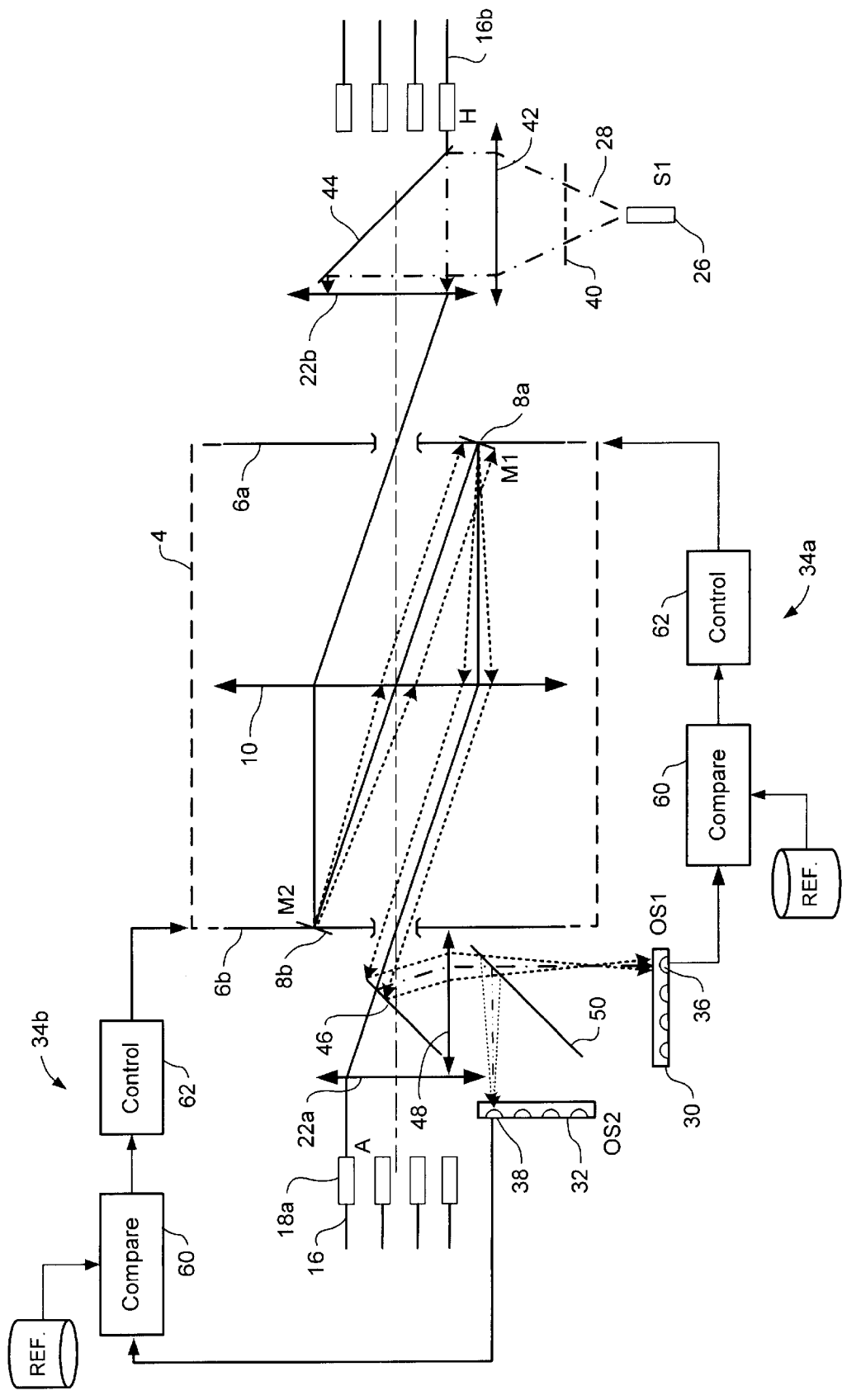
FIG. 2 is a schematic illustration showing principle elements of a control system in accordance with a first embodiment of the present invention, deployed in the optical cross-connect of FIG. 1.

As shown in FIG. 2, a first preferred embodiment of the invention comprises a pilot light source 26 arranged to inject a pilot light 28 into the switch core 4 substantially collinear with live traffic; a pair of optical sensor arrays 30, 32 arranged to detect respective geometric features of the pilot light 28 emerging from the switch core 4; and a feedback path 34 between each optical sensor array 30, 32 and each mirror 8 of a respective MEMS array 6. Optical sensor array 30 includes one wavefront sensor 36 for each mirror 8 of MEMS array 6a, as will be described in greater detail below. Similarly, optical sensor 32 includes a position sensor 38, as will also be described in greater detail below. This arrangement enables simple optical detection and mirror control of every MEMS mirror 8 within the switch core 4.

Thus, as shown in FIG. 2, an optical source 26 (S1) is provided for inserting a pilot light 28, which counter-propagates with live traffic light beams (propagating from A-H). As may be appreciated, the pilot light 28 can be inserted to co-propagate with live traffic, if necessary or desired. However, where possible, it is preferable to insert the pilot light 28 to counter-propagate with live traffic, as this tends to minimize interference. The area of the pilot light 28 may be expanded (as shown) to cover a size approximately equal to that of a respective input/output fiber bundle 12 to eliminate the need for additional collimating optics. If desired, a hole plate 40 can be inserted into the path of light emerging from the source 26 to create multiple beamlets, if a single wide pilot light is not deemed appropriate.

The pilot light 28 is preferably out-of-band, in that the wavelength of the source 26 preferably lies outside the expected operating range of the live traffic, so that monitoring can be concurrent with (and independent of) the live traffic. The pilot light 28 is collimated by a collimating lens 42, and combined substantially co-linearly with the respective fiber bundle 12 using, for example, a WDM beam combiner 44 placed between the fiber bundle 12 and its relay lens 22. This enables the pilot light 28 to enter and propagate through the switch core 4 co-linearly with live traffic, such that the pilot light 28 will be affected by positioning errors of the MEMS mirrors 8 substantially identically to that of the live traffic.

As may be seen in FIG. 2, pilot light 28 emerging from the switch core 4 is split from the live traffic using, for example, a WDM splitter 46 placed between the optical bypass 20a and the relay lens 22a. The wavelength sensitive WDM splitter 46 is designed to at least partially reflect pilot light, while allowing live traffic wavelengths to pass through unaffected. This beam splitter 46 may be provided as either a single component or a combination of a beam splitter and a filter. A pilot relay lens 48 then images the pilot light 28 onto optical sensor arrays 30 and 32. The pilot relay lens 48 is preferably arranged such that one of its focal points is coextensive with that of the relay lens 22 (i.e., within the optical bypass 20), so that the geometric properties of the pilot light 28 arriving at the optical sensor arrays 30 and 32 correspond directly with those of live traffic arriving at the collimators 18 of the output fiber bundle 12b. In order to facilitate imaging of the pilot light 28 onto both optical sensor arrays 30 and 32, a semi-transparent beam splitter 50 can be used to split the pilot light 28 in a manner well known in the art.

Consequently, pilot light 28 originating from source S1 26 is inserted into the switch core 4 through WDM combiner 44 and relay lens 22b; passes through the switch core 4 with reflections from MEMS mirror M2 8b (at G), then M1 8a (at E); and is imaged onto the optical sensors OS1 30 and OS2 32 by the WDM splitter 46, pilot relay lens 48 and semi-transparent beam splitter 50. Due to the imaging properties of the switch core 4, there is a one-to-one-to-one correspondence between each collimator 18 of the input fiber bundle 12a, a MEMS mirror M1 8a of the first MEMS array 6a; and a wavefront sensor 36 of OS1 30a. Furthermore, once an optical path (from A to H) has been set up through the switch core 4, there is a one-to-one-to-one correspondence between each collimator 18 of the input fiber bundle 12a, a MEMS mirror M2 8b of the second MEMS array 6b; and a position sensor 38 of OS2 32. This arrangement means that each sensor 36, 38 is uniquely associated with one MEMS mirror 8b of array 6b.

Thus, for example, pilot light 28 arriving at the optical sensor array OS1 30 from mirror M1 8a is imaged on a unique one of the wavefront sensors 36 within the array 30. It is therefore possible to define a respective feedback path 34a between each wavefront sensor 36 of the array 30 and its associated mirror 8a in the MEMS array 6a, thereby enabling simultaneous control of every mirror 8a in the MEMS array 6a. A similar situation holds for optical sensor array OS2 32: pilot light 28 arriving at the optical sensor OS2 32 from mirror M2 8b (via M1 8a) is imaged on a unique one of the position sensors 38 within the array 32, so that a respective feedback path 34b can be provided between the each position sensor 38 of the optical sensor array OS2 32 and the involved mirror M2 8b in the MEMS array 6b, to thereby enable simultaneous control of every mirror in the MEMS array. The difference between the two feedback loops is that the relationship between each mirror M1 8a of the first MEMS array 6a, and an associated wavefront sensor 36 of OS1 30 is fixed by the imaging properties of the switch core 4. On the other hand, the relationship between each mirror M2 8b of the second MEMS array 6b, and an associated position sensor 38 of OS2 32 is dependent on the optical path mapped through the switch core 4 (from A to H).

Figure 3B:
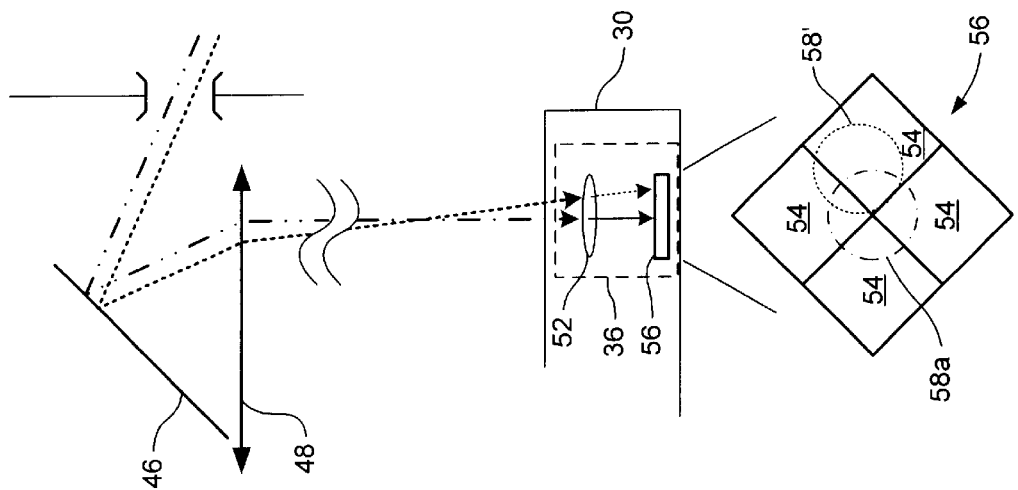
FIGS. 3a and 3b schematically illustrate principle elements and operation of a wavefront sensor usable in the embodiment of FIG. 2.
Figure 3A:
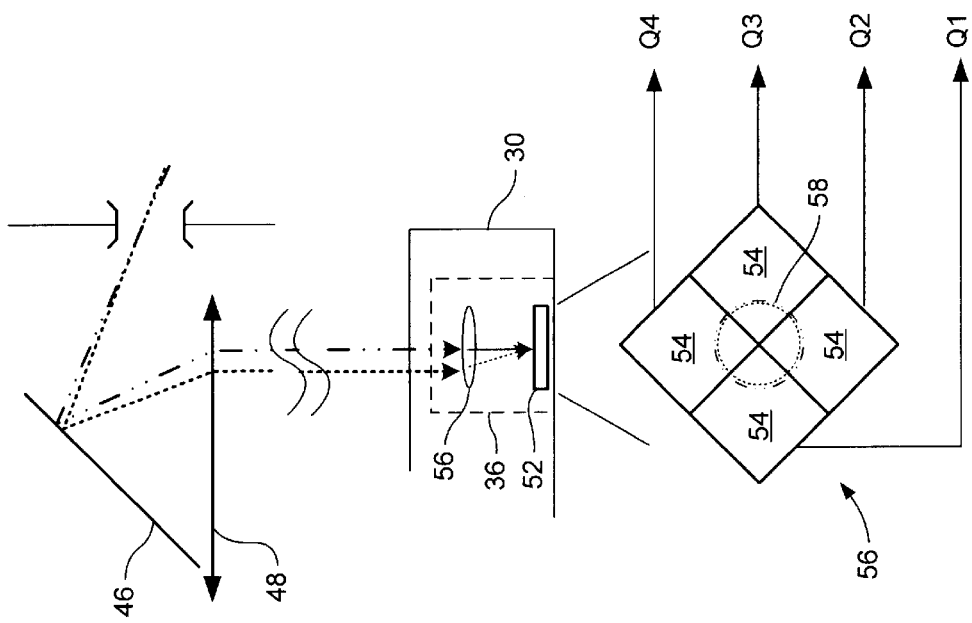

As shown in FIG. 3a, each wavefront sensor 36 comprises a micro-lens 52 coupled to an array of photodetectors 54. In the embodiment of FIGS. 3a and 3b, a set of four photodetectors 54 lie in a focal plane of the micro-lens 52, and are arranged to define a quadrant detector 56. Alternatively, a Charge-Coupled Diode (CCD) array can arranged in the focal plane of the micro-lens 52 to operate as the quadrant detector 56. In either case, the micro-lens 52 images the pilot light 28 as a light spot 58 on the quadrant detector 56. As may be seen in FIG. 3a, the location of the light spot 58 on the quadrant detector 56 is substantially unaffected by a lateral offset of the pilot light 28. However, an angular offset in the pilot light 28 produces a significant change in the spot location, as shown in FIG. 3b. Thus it will be seen that the wavefront detector 36 of FIGS. 3a and 3b detects angular changes in the light propagation path, while being substantially insensitive to lateral changes. As such, the location of the beam spot is directly (and unambiguously) related to the angular orientation of the associated MEMS mirror 8a in the MEMS array 6a.

Figure 4A:
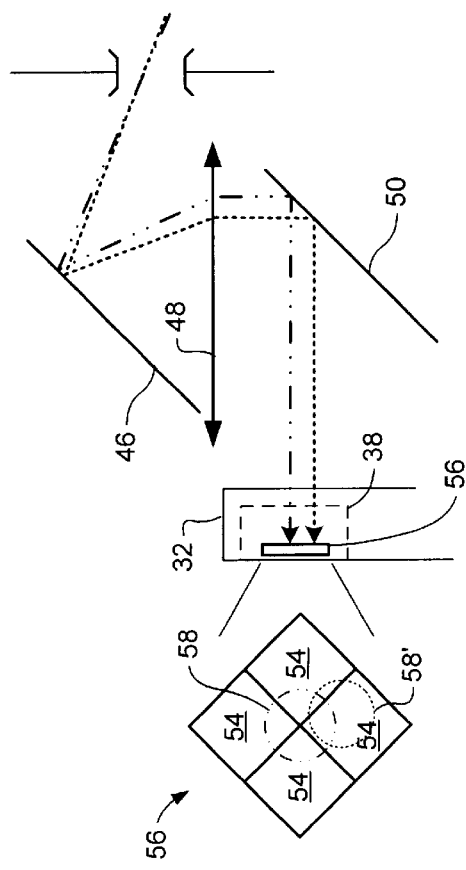
FIGS. 4a and 4b schematically illustrate principle elements and operation of a position sensor usable in the embodiment of FIG. 2.
Figure 4B:
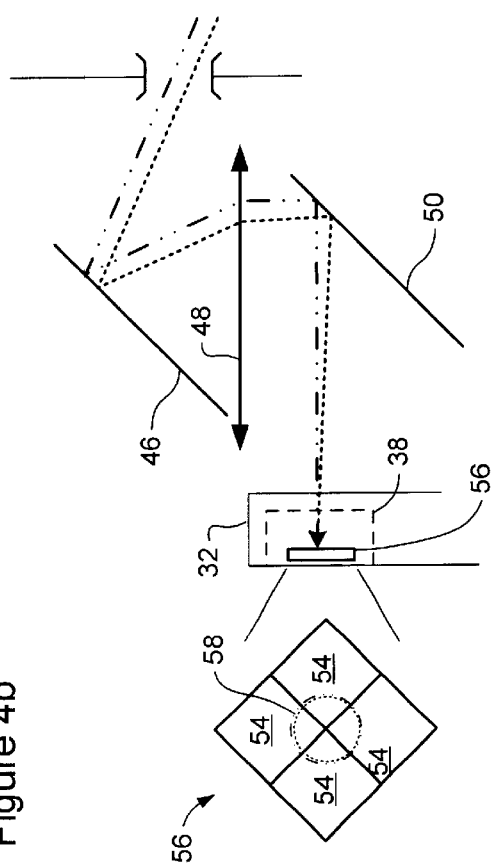

As shown in FIG. 4a, each position sensor 38 comprises an array of photodetectors 54. In the embodiment of FIGS. 4a and 4b, a set of four photodetectors 54 lie in a focal plane of the pilot relay lens 48, and are arranged to define a quadrant detector 56. Alternatively, a Charge-Coupled Diode (CCD) array can arranged in the focal plane of the pilot relay lens 48 to operate as the quadrant detector 56. In either case, the pilot relay lens 48 images the pilot light 28 as a light spot 58 on the quadrant detector 56. As may be seen in FIG. 4a, a lateral offset in the pilot light 28 produces a significant change in the spot location. However, the location of the light spot 58 on the quadrant detector 56 is substantially unaffected by an angular offset of the pilot light 28, as shown in FIG. 4b. Thus it will be seen that the position detector 36 of FIGS. 4a and 4b detects lateral changes in the light propagation path, while being substantially insensitive to angular changes. As such, the location of the beam spot is directly (and unambiguously) related to the angular orientation of MEMS mirror M2 8b in the MEMS array 6b.

In both the wavefront detector 36 and position sensor 38, the quadrant detector 56 outputs a set of four electrical signals Q1–Q4, which together indicate the position of the light spot 58 on the quadrant detector 56. If desired, a signal processor (not shown) can combine these four quadrant signals Q1–Q4 to produce a pair of detector signals which indicate the location of the light spot with respect to respective orthogonal axes. These signals (either Q1–Q4, or detector signals) can be processed by the feedback path 34 to move the associated MEMS mirror 8a (left, right, up and down, for example) to optimize its position. In particular, the feedback path 34a can include a comparator 60 which operates to compare the beam spot location (as indicated by the quadrant signals, for example) to a predetermined reference position which corresponds to optimum coupling of light between input and output waveguides 16. This reference position can be determined by calibration of the feedback path 34a, for example during manufacture of the cross-connect 2. For calibration, the mirror position can be optimized for maximum coupling of optical energy into the output waveguide. For this optimized (reference) position, the four signals Q1–Q4 generated by the quadrant detector 56 are read and stored as reference position data in a look-up table (not shown). During subsequent operation of the cross-connect 2, the real-time signals Q1–Q4 generated by the quadrant detector 56 are compared to the reference position data to obtain error signals indicative of an error between the current and reference positions. The error signals can then be used by a controller 62 to actively adjust the position of the mirror 8a. This control operation can be simultaneously performed, in real-time, for each mirror 8a in the MEMS array 6a.

Figure 5:
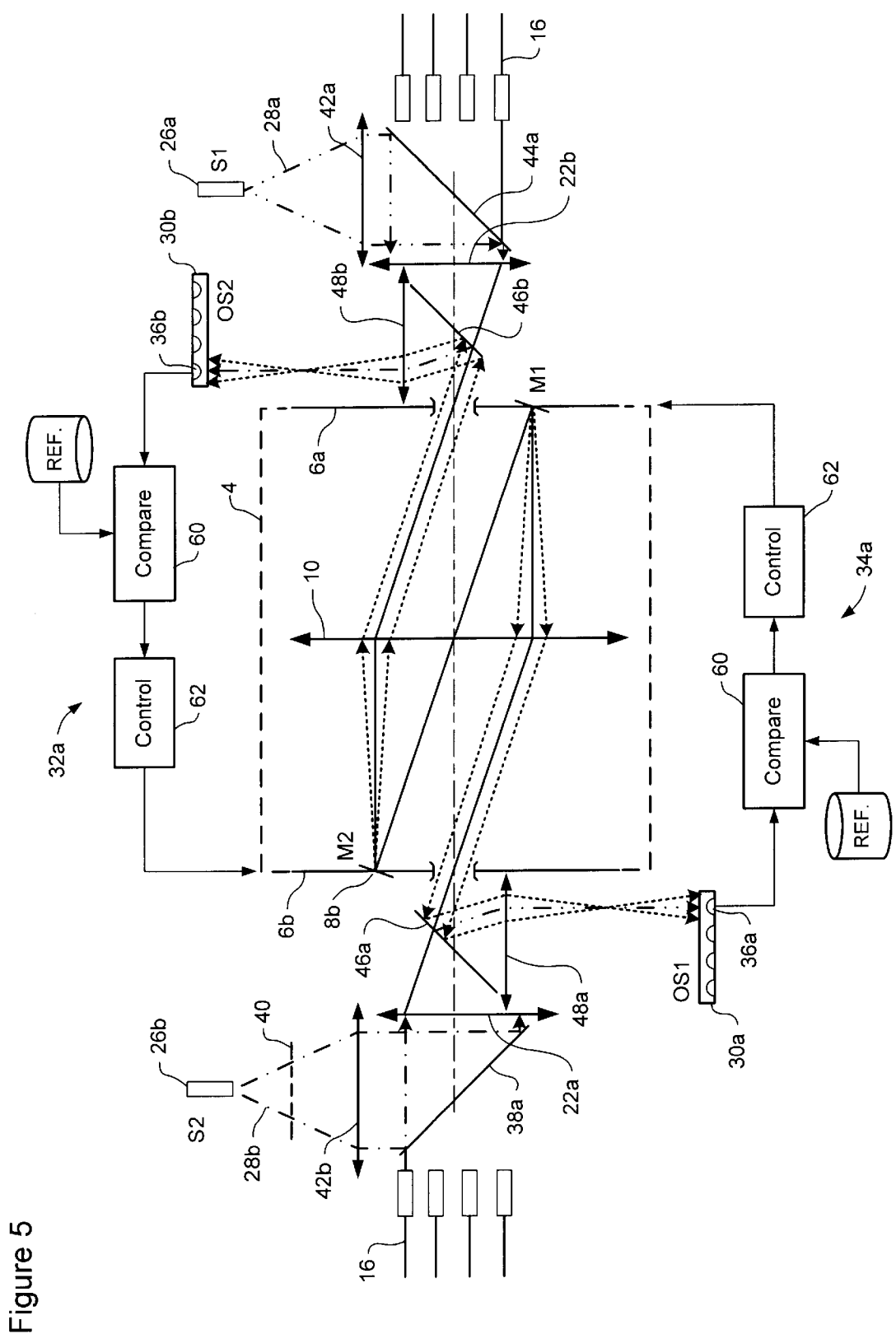
FIG. 5 is a schematic illustration showing principle elements of a control system in accordance with a second embodiment of the present invention, deployed in the optical cross-connect of FIG. 1
Figure 6:
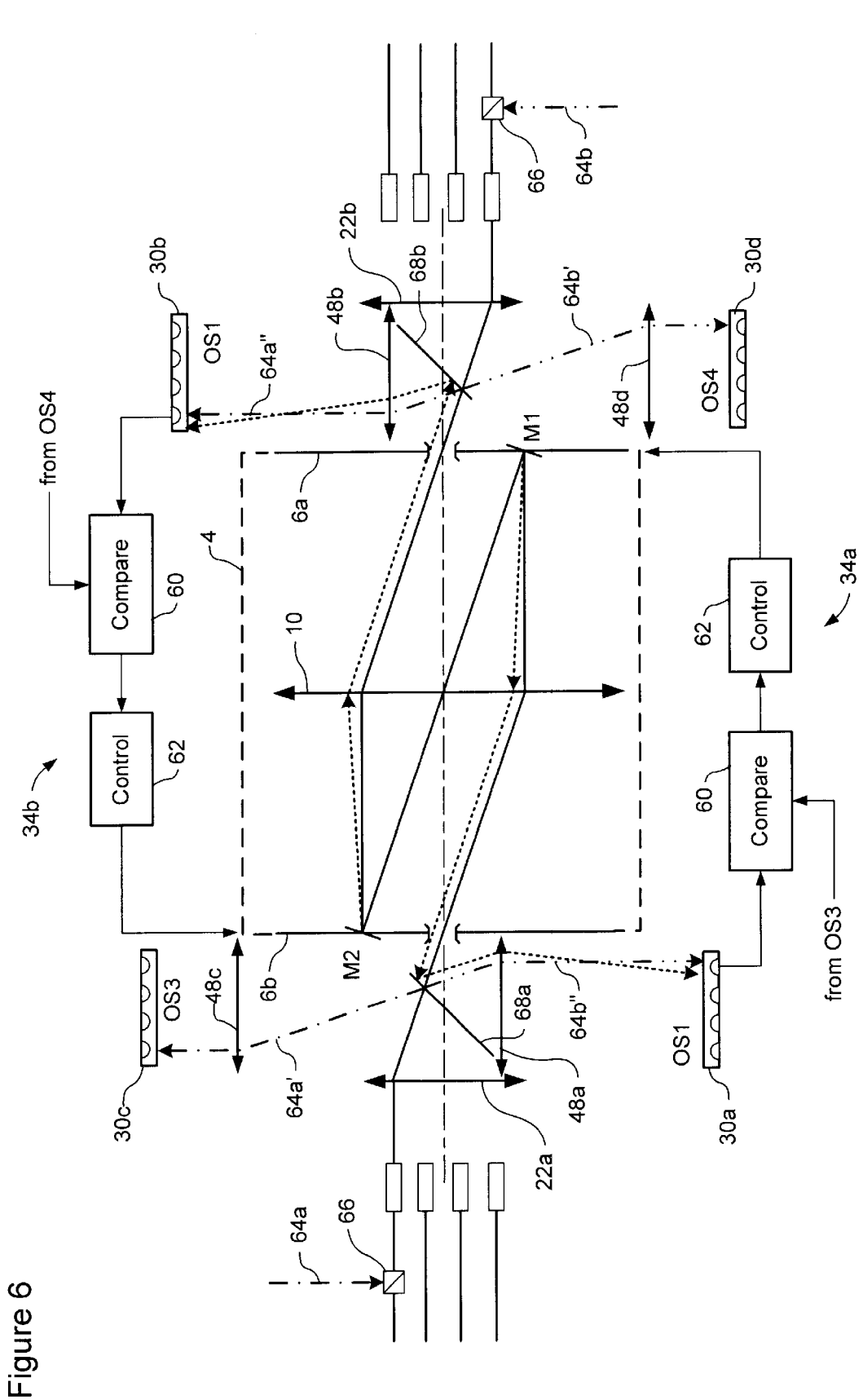
FIG. 6 is a schematic illustration showing principle elements of a control system in accordance with a third embodiment of the present invention, deployed in the optical cross-connect of FIG. 1.

As shown in FIG. 5, a second preferred embodiment of the invention comprises a pair of pilot light sources 26a,b arranged to inject respective pilot lights 28a,b into the switch core 4 substantially collinear with live traffic; an optical sensor array 30a,b arranged to detect the pilot lights 28a,b emerging from the switch core 4; and a respective feedback path 34a,b between each optical sensor array 30a,b and each mirror 8 of the opposite MEMS array 6. Each optical sensor array 30 includes one wavefront sensor 36 for each mirror 8 of the opposite MEMS array 6, as will be described in greater detail below. This arrangement enables simple optical detection and mirror control of every MEMS mirror 8 within the switch core 4.

Thus, as shown in FIG. 2, a pair of optical sources 26 (S1 and S2) is provided for inserting respective pilot lights 28, one co-propagating and the other counter-propagating with respect to the input fiber light (from A-H). The area of each pilot light 28 may be expanded (as shown) to cover a size approximately equal to that of the respective input/output fiber bundle 12 to eliminate the need for additional collimating optics. If desired, a hole plate 27 can be inserted into the path of light emerging from a source 26 to create multiple beamlets, if a single wide pilot light is not deemed appropriate.

As may be seen in FIG. 2, pilot light 28 emerging from the switch core 4 is split from the live traffic using, for example, a WDM splitter 46 placed between the optical bypass 20 and the relay lens 22. The wavelength sensitive WDM splitter 46 is designed to partially reflect pilot beam light, while allowing live traffic wavelengths to pass through unaffected. This beam splitter 40 may be provided as either a single component or a combination of a beam splitter and a filter. A pilot relay lens 48 then images the pilot light 28 onto a respective optical sensor array 30. The pilot relay lens 48 is preferably arranged such that its focal point is coextensive with that of the relay lens 22 (i.e., within the optical bypass 20), so that the geometric properties of the pilot light 28 arriving at the optical sensor array 30 correspond directly with those of live traffic arriving at the collimators 18 of the fiber bundle 12.

Consequently, pilot light 28*a* originating from source S1 26*a* is inserted into the switch core 4 through WDM combiner 44*a* and relay lens 22*b*; passes through the switch core 4 with reflections from MEMS mirror M2 8*b* (at G) then M1 8*a* (at E); and is imaged onto the optical sensor OS1 30*a* by the WDM splitter 46*a* and pilot relay lens 48*a*. Similarly, pilot light 28*b* originating from source S2 26*b* is inserted into the switch core 4 through WDM combiner 44*b* and relay lens 22*a*; passes through the switch core 4 with reflections from MEMS mirror M1 8*a* (at E) then M2 8*b* (at G); and is imaged onto the optical sensor OS2 30*b* by the WDM splitter 46*b* and pilot relay lens 48*b*. Due to the imaging properties of the switch core 4, there is a one-to-one-to-one correspondence between each collimator 18 of the input fiber bundle 12*a*, a MEMS mirror 8*a* of the first MEMS array 6*a*; and a wavefront sensor 36 of OS1 30*a*. Similarly, there is a one-to-one-to-one correspondence between each collimator 18 of the output fiber bundle 12*b*, a MEMS mirror 8*b* of the second MEMS array 6*b*; and a wavefront sensor 36 of OS2 30*b*. This arrangement means that each wavefront sensor 36 is uniquely associated with one MEMS mirror 8, which is itself uniquely associated with one collimator 18 on the opposite side of the switch core 4.

Thus, for example, pilot light 28*a* arriving at the optical sensor OS1 30*a* from mirror M1 8*a* is imaged on a unique one of the wavefront sensors 34 within the array 30*a*. It is therefore possible to define a respective feedback path 34*a* between each wavefront sensor 36 of the array 30*a* and its associated mirror 8*a* in the MEMS array 6*a*, thereby enabling simultaneous control of every mirror 8*a* in the MEMS array 6*a*. The same situation also holds in the opposite direction: pilot light 28*b* arriving at the optical sensor OS2 30*b* from mirror M2 8*b* is imaged on a unique one of the wavefront sensors 34 within the array 30*b*, so that a respective feedback path 34*b* can be provided between each wavefront sensor 36 of the optical sensor array OS2 30*b* and its associated mirror 8*b* in the MEMS array 6*b*, to thereby enable simultaneous control of every mirror in the MEMS array 6*b*.

Although it is intended for the two monitoring optical sources S1 and S2, 28*a* and 28*b* to be very closely aligned to the input and output fiber bundles 12, small imperfections in fabrication will likely lead to slight misalignment between the light emerging or incident on the fiber array (live traffic) and the sources S1 and S2. This misalignment is manifested by the reference position being off-center on the corresponding quadrant detector 56, and thus is automatically accommodated during the initial calibration of the feedback path 34.

Over time there could be an independent movement between the input/output fiber arrays 12 and the monitoring optical sources, S1 and S2 26. This relative motion would introduce an increase in the insertion loss if not corrected. This problem may be addressed by using several probe beams, for example one emerging from waveguides at each corner in the input fiber array 12*a*, which are switched through the switch core to a corresponding set of fibers in the output array 12*b*. These probe beams can be kept in a closed feedback loop for optimum transmission. Any differential movement between the input/output fiber arrays 12*a,b*, the collimating lenses 18, the MEMS mirrors 8 and lens 10 will create a shift between the initial quadrant detector alignment readings and new ones (created from the tracking loop of the probe beams). Using signal processing, an appropriate correction could be calculated and applied to the initial calibration table. This method can ensure low transmission losses across the cross-connect provided that the individual waveguides 16 do not move relative to each other.

FIG. 4 illustrates principle elements and operation of a third embodiment of the present invention. In the embodiment of FIG. 4, out-of-band pilot beams 64 are added directly to each of the input and output waveguides 16 (e.g., using beam combiners 66), and propagate in opposite directions through the cross-connect 2. Four optical sensor arrays 30 are used to receive light reflected from wavelength sensitive beam splitters 68 (that at least partially reflects pilot beam light, while allowing live traffic wavelengths to pass through unaffected). These beam splitters may be provided as either a single component or a combination of a beam splitter and a filter.

A pilot beam 64*a* travelling from left to right is split on the first beam splitter 68*a*. Part of the beam 64*a*' is imaged on an optical sensor OS3 30*c*, and the other part of the pilot beam propagates through the switch core 4. The pilot beam emerging from the cross-connect is split by the second beam splitter 68*b*, and a portion of the beam 64*a*" imaged onto optical sensor OS2 30*b*. Conversely, a pilot beam 64*b* travelling from right to left is split on the second beam splitter 68*b*. Part of the pilot beam 64*b*' is imaged onto OS4 30*d*, and the rest propagates through the switch core 4. The pilot beam emerging from the switch core 4 then splits on the first beam splitter 68*a*, and part of this light 64*b*" is imaged onto OS1 30*a*.

As may be appreciated, the pilot beam 64*a*' imaged on optical sensor OS3 emerges from its respective waveguide 16 precisely co-linear with the live traffic. Accordingly, the detected location of the beam spot 58 imaged on the respective quadrant detector 56 is directly indicative of the optimum path for coupling light into that waveguide 16. Thus the quadrant signals produced by OS3 30*c* can be used as a target reference, for comparison with the quadrant signals generated by OS1 30*a*. Similarly, the pilot beam 64*b*' imaged on sensor OS4 30*d* emerges from its respective waveguide 16 precisely co-linear with the live traffic. Accordingly, the quadrant signals produced by OS4 30*d* can be used as a target reference for comparison with the quadrant signals generated by OS2 30*b*.

The pilot beams detected by OS3 and OS4 are then the targets for OS1 and OS2 respectively. Any deviation from these targets would cause angular misalignment of the live traffic beams arriving at the micro-collimators 18, therefore adding insertion losses. Therefore, the feedback signals required to control the positions of each involved mirror 8 are the difference between the detector readings of OS3-OS1 and OS4-OS2. With each wavefront sensor 36 consisting of a micro-lens 52 and a quadrant detector 56 (as shown in FIGS. 3*a* and 3*b*), two signed error signals can be obtained per wavefront sensor. The two error signals from OS3-OS1 are fed back to control micro-mirror M1, while the two error signals from OS4-OS2 are fed back to control micro-mirror M2.

The advantage of this embodiment is that no calibration of the feedback system is required. Indeed, optimum coupling corresponds to a beam detected by OS1 being identical to the beam detected by OS3, and similarly for OS2 and OS4.

When the switch is assembled, its look-up table is loaded with initial values defined assuming ideal ATO imaging (i.e., linear angle per port assignment). When the 4 wavefront sensors are turned on, OS3 and OS4 immediately provide real target references for switch alignment, independently of the switch state. Feedback signals are issued to correct the switch look-up table in a converging manner. An initial scan could be performed to guarantee that all states have been updated, but this may not be necessary since this embodiment provides both the error signal and a continuously updated target reference.

The embodiment(s) of the invention described above is (are) intended to be exemplary only. The scope of the invention is therefore intended to be limited solely by the scope of the appended claims.

We claim:

1. A control system for an optical cross-connect having a switch core defined by first and second independently movable beam deflectors adapted to selectively define an optical path between a pair of ports of the optical cross-connect, and an optical element having optical power disposed in a propagation path of light beams between the first and second beam deflectors, the control system comprising:

a pilot light source adapted to insert a respective pilot light into the switch core substantially colinearly with live traffic;

a respective optical sensor associated with each beam deflector and adapted to detect a predetermined geometric property of the pilot light emerging from the switch core from the associated beam deflector, the predetermined geometric property being unambiguously associated with an angular position of the associated beam deflector; and a feedback path adapted to actively control a position of the associated beam deflector based on the detected geometric property.

2. A control system as claimed in claim 1, wherein the optical element having optical power comprises either one of: a focussing mirror having a focal plane; and a lens.

3. A control system as claimed in claim 2, wherein the first and second independently moveable beam deflectors are disposed in a focal plane of the optical element.

4. A control system as claimed in claim 1, wherein each pilot light source comprises:

an emitter adapted to generate the pilot light; and a beam combiner adapted to direct the pilot light into the switch core substantially colinearly with live traffic.

5. A control system as claimed in claim 4, wherein a wavelength of the pilot light is out-of-band with respect to the live traffic.

6. A control system as claimed in claim 4, wherein a respective beam combiner is provided for each port, such that the pilot light is directed into the switch core through one of the ports.

7. A control system as claimed in claim 4, wherein a single beam combiner is disposed between each port and the switch core, such that the pilot light is directed into the switch core substantially colinearly with live traffic between the ports.

8. A control system as claimed in claim 7, further comprising a hole-plate disposed between the emitter and the combiner for dividing the pilot light into a plurality of beamlets.

9. A control system as claimed in claim 1, wherein the geometric property comprises an angular orientation of the propagation path of the pilot light.

10. A control system as claimed in claim 9, wherein the optical sensor comprises:

a micro-lens adapted to image the light beam as a spot of light on a respective image plane of the optical sensor, the location of the spot within the image plane being substantially a function of the predetermined geometric property of the light beam; and a quadrant detector disposed substantially coextensive with the image plane for generating a detector signal indicative of a location of the spot of light on the image plane.

11. A control system as claimed in claim 10, further comprising:

a beam splitter adapted to separate the pilot light emerging from the switch core from live traffic; and a pilot relay lens adapted to image the separated pilot light onto the optical sensor, such that the geometric property of the pilot light detected by the optical sensor corresponds with a geometric property of live traffic arriving at the respective port from the associated mirror.

12. A control system as claimed in claim 1, wherein the feedback path comprises:

a comparator adapted to compare the detected geometric property with a reference, and generate an error signal based on the comparison result; and a controller adapted to control a position of the associated mirror in accordance with the error signal.

13. A control system as claimed in claim 12, wherein the reference comprises a calibrated reference corresponding to a calibrated optimum cross-coupling of the light beam through the cross-connect.

14. A control system as claimed in claim 12, wherein the reference comprises a target geometric property indicative of an ideal propagation path between the ports.

15. A control system as claimed in claim 14, further comprising a second optical sensor adapted to detect a predetermined geometric property of a second pilot light emerging from a second pilot light source as the target geometric property.

16. A method of controlling an optical cross-connect having a switch core defined by first and second independently movable beam deflectors adapted to selectively define an optical path between a pair of ports of the optical cross-connect, and an optical element having optical power disposed in a propagation path of light beams between the first and second beam deflectors, the method comprising:

a) inserting a pilot light into the switch core substantially colinearly with live traffic;

b) detecting a predetermined geometric property of the pilot light emerging from the switch core from the associated beam deflector, the predetermined geometric property being unambiguously associated with an angular position of the associated beam deflector; and c) actively controlling a position of the associated beam deflector based on the detected geometric property.

17. A method as claimed in claim 16, wherein step a) includes inserting a single pilot light directed into the switch core substantially colinearly with live traffic between a plurality of ports on each side of the switch core.

18. A method as claimed in claim 17, wherein step a) also includes splitting the pilot light into a plurality of beamlets.

19. A method as claimed in claim 16, wherein step a) includes inserting a respective pilot light into each port.

20. A method as claimed in claim 16, wherein the geometric property comprises an angular orientation of the propagation path of the pilot light.

21. A method as claimed in claim 16, wherein the geometric property comprises a lateral position of the propagation path of the pilot light.

22. A method as claimed in claim 16, wherein step c) comprises:

comparing the detected geometric property with a reference, and generate an error signal based on the comparison result; and actively controlling the position of the associated mirror in accordance with the error signal.

23. A method as claimed in claim 22, wherein the reference comprises a calibrated reference corresponding to a calibrated optimum cross-coupling of the light beam through the cross-connect.

24. A method as claimed in claim 22, wherein the reference comprises a target geometric property indicative of an ideal propagation path between the ports.

25. A method as claimed in claim 24, further comprising a step of detecting a predetermined geometric property of a second pilot light emerging from a second pilot light source as the target geometric property.

* * * * *